US008194378B2

(12) United States Patent
Hyun et al.

(10) Patent No.: US 8,194,378 B2
(45) Date of Patent: Jun. 5, 2012

(54) LINE COMMUTATION TYPE FAULT CURRENT LIMITER

(75) Inventors: Ok-Bae Hyun, Daejeon (KR); Seong-Woo Yim, Daejeon (KR); Hye-Rim Kim, Daejeon (KR)

(73) Assignee: Korea Electric Power Corporation, Gangnamgu (KR)

( * ) Notice: Subject to any disclaimer, the term of this patent is extended or adjusted under 35 U.S.C. 154(b) by 446 days.

(21) Appl. No.: 12/568,221

(22) Filed: Sep. 28, 2009

(65) Prior Publication Data

US 2010/0110598 A1 May 6, 2010

(30) Foreign Application Priority Data

Oct. 30, 2008 (KR) ........................ 10-2008-0107346

(51) Int. Cl.
*H02H 9/08* (2006.01)

(52) U.S. Cl. ...................................................... 361/93.9

(58) Field of Classification Search ........................ None
See application file for complete search history.

(56) References Cited

U.S. PATENT DOCUMENTS 3,273,018 A * 9/1966 Goldberg ........................ 361/58
3,343,060 A * 9/1967 Ingraham ...................... 320/125
7,554,279 B2 * 6/2009 Loffler et al. ............ 318/400.07
7,808,191 B2 * 10/2010 Wu ............................... 315/307
2008/0048588 A1 * 2/2008 Mehta ........................... 315/309
2009/0052097 A1 * 2/2009 Hyun et al. ..................... 361/19

* cited by examiner

*Primary Examiner* — Stephen W Jackson
*Assistant Examiner* — Angela Brooks
(74) *Attorney, Agent, or Firm* — McDermott Will & Emery LLP

(57) ABSTRACT

A line commutation type fault current limiter which can reduce manufacturing and maintenance costs, carry out line commutation by operating a cutoff switch by fault current energy, respond rapidly to a fault, be immediately restored to an original state, and perform either an active or a passive operation. The line commutation type fault current limiter includes a coupled inductor having a primary side connected to a main circuit and a secondary side matched with the primary side, a Zener diode switch electrically connected to the secondary side of the coupled inductor, a line commutation switch connected to the Zener diode switch as well as the primary side of the coupled inductor to form a bypass path in parallel with the primary side of the coupled inductor and to cut off the main circuit, when the Zener diode switch is turned on, and a current limiting unit electrically connected in parallel with the line commutation switch to limit a current flowing into the main circuit.

18 Claims, 4 Drawing Sheets

100
120
130
140
142
110
143
141
144
150

LINE COMMUTATION TYPE FAULT CURRENT LIMITER

CROSS REFERENCE TO RELATED APPLICATION

This application claims priority from and the benefit of Korean Patent Application No. 10-2008-0107346, filed on Oct. 30, 2008, which is hereby incorporated by reference for all purposes as if fully set forth herein.

BACKGROUND OF THE INVENTION

1. Field of the Invention

The present invention relates to a line commutation type fault current limiter, and more particularly, to a line commutation type fault current limiter which can reduce manufacturing and maintenance costs, carry out line commutation by operating a cutoff switch by fault current energy, respond rapidly to a fault, be immediately restored to an original state, and perform either an active or a passive operation.

2. Discussion of the Related Art

An electric power system uses a fault current limiter to prevent an overcurrent exceeding a threshold value from flowing into the system when an accident such as a lightning strike, a ground fault, or a short circuit occurs.

The most important factors in a line commutation type fault current limiter are a fault sensing scheme and a cutoff switch driving scheme. Fault is generally sensed using an external fault sensing device and a cutoff switch is opened by operating a cutoff switch driving device to perform line commutation. For such a method, the line commutation type fault current limiter should additionally include the external fault sensing device and the cutoff switch driving device. Moreover, external energy is needed to drive the cutoff switch, and a semiconductor switch for a large quantity of current or a large-capacity energy storage device is demanded, thereby increasing manufacturing costs.

To solve such problems, a method is used for operating the cutoff switch using fault current energy without the need of an additional energy source or the cutoff switch driving device. In this method, if a superconducting fault current limiting element connected serially to the cutoff switch is quenched by a fault current and therefore generates resistance, the current is bypassed to a cutoff switch driving coil. Then a repulsive force generated by a magnetic field of the coil and a current induced to an adjacent metal conductor acts directly on the cutoff switch to open the cutoff switch and complete line commutation. Thereafter, the fault current limiting unit limits the current. However, since this method requires a superconductor manufactured to endure a rated current and a cooling device for the superconductor, installation and maintenance costs are raised. Furthermore, since this method uses passive elements, it is difficult to actively operate constituent elements according to a usage condition.

SUMMARY OF THE INVENTION

This invention provides a line commutation type fault current limiter which can reduce manufacturing and maintenance costs, carry out line commutation by operating a cutoff switch by fault current energy, respond rapidly to a fault, be immediately restored to an original state, and perform either an active or a passive operation.

In an exemplary embodiment, a line commutation type fault current limiter includes a coupled inductor having a primary side connected to a main circuit and a secondary side matched with the primary side, a Zener diode switch electrically connected to the secondary side of the coupled inductor, a line commutation switch connected to the Zener diode switch to form a bypass path in parallel with the primary side of the coupled inductor and to cut off the main circuit, when the Zener diode switch is turned on, and a current limiting unit electrically connected to the bypass path to limit a current flowing into the main circuit.

The Zener diode switch may include a snubber circuit electrically connected to the secondary side of the coupled inductor, a pair of thyristors connected in reverse parallel with each other, each of the thyristors having an anode electrode and a cathode electrode connected in parallel with the snubber circuit, a pair of diodes, each of the diodes having a cathode electrode connected to a control electrode of each of the thyristors, and a pair of Zener diodes, each of the Zener diodes having an anode electrode connected to an anode electrode of each of the diodes and having a cathode electrode connected to the anode electrode of each of the thyristors.

The Zener diode switch may further include resistors connected between the cathode electrodes of the Zener diodes and the anode electrodes of the thyristors.

The line commutation switch may include a main circuit switch serially connected to the primary side of the coupled inductor connected to the main circuit, a driving coil electrically connected to the Zener diode switch, a repulsion plate mechanically connected to the main circuit switch and located separately from the driving coil to open the main circuit switch by a magnetic force of the driving coil when a current is applied to the driving coil, and a current limiting circuit switch mechanically connected to the repulsion plate to short the bypass path formed in parallel with the primary side of the coupled inductor when a current is applied to the driving coil.

A semiconductor element switch may be connected between the coupled inductor and the main circuit switch.

The line commutation type fault current limiter may further include a fault detection unit connected in parallel with the line commutation switch to determine a fault signal by absorbing energy during a preset time when a current of energy less than preset energy passes through the Zener diode switch.

The fault detection unit may be at least one or a combination of a superconductor, a condenser, and a high pass filter.

The current limiting unit may be at least one or a combination of a power fuse, a nonlinear variable conductor, a reactor coil, a power semiconductor switch, and a superconductor.

The line commutation type fault current limiter may further include a fault sensing unit connected to the Zener diode switch to apply an electric signal which turns on the Zener diode switch when a fault current is applied to the primary side of the coupled inductor.

The line commutation type fault current limiter may further include a power fuse connected in parallel with the current limiting unit.

In another exemplary embodiment, a line commutation type fault current limiter includes an inductor connected to a main circuit, a Zener diode switch electrically connected to an end of the inductor, a line commutation switch connected to the Zener diode switch to form a bypass path in parallel with the inductor and to cut off the main circuit, when the Zener diode switch is turned on, and a current limiting unit electrically connected to the bypass path to limit a current flowing into the main circuit.

The Zener diode switch may include a snubber circuit electrically connected to an end of the inductor, a pair of thyristors connected in reverse parallel with each other, each of the thyristors having an anode electrode and a cathode electrode connected in parallel with the snubber circuit, a pair of diodes, each of the diodes having a cathode electrode connected to a control electrode of each of the thyristors, and a pair of Zener diodes, each of the Zener diodes having an anode electrode connected to an anode electrode of each of the diodes and having a cathode electrode connected to the anode electrode of each of the thyristors.

The line commutation switch may include a main circuit switch serially connected to the other end of the inductor connected to the main circuit, a driving coil electrically connected to the Zener diode switch, a repulsion plate mechanically connected to the main circuit switch and located separately from the driving coil to open the main circuit switch by a magnetic force of the driving coil when a current is applied to the driving coil, and a current limiting circuit switch mechanically connected to the repulsion plate to short the bypass path formed in parallel with the inductor when a current is applied to the driving coil.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather these embodiments are provided so that this disclosure is thorough, and will fully convey the scope of the invention to those skilled in the art.

Hereinafter, the configuration of a line commutation type fault current limiter according to an exemplary embodiment of the present invention will be described.

Figure 1:
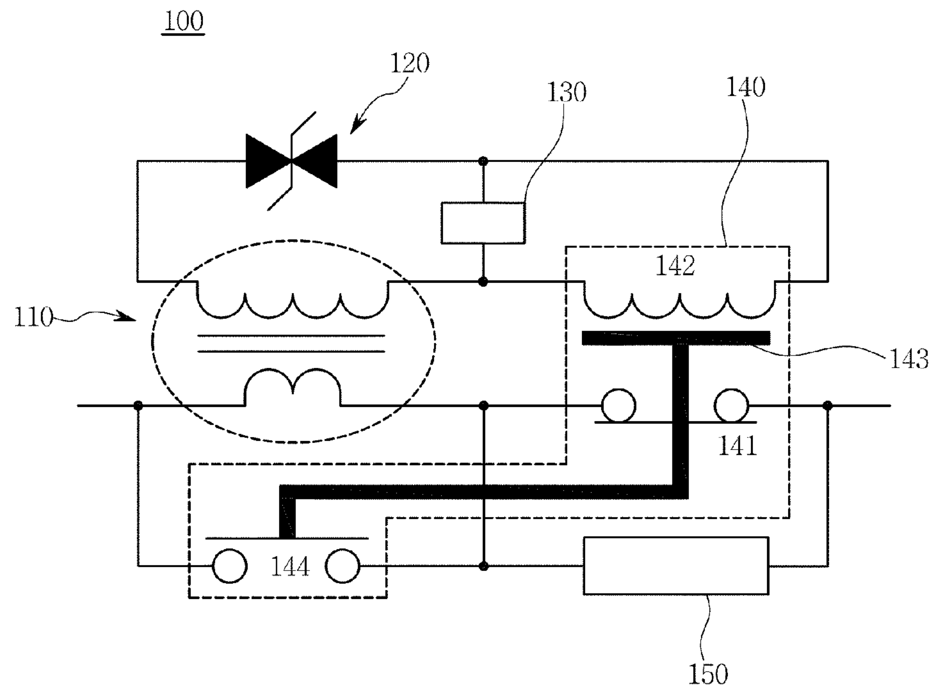
FIG. 1 is a circuit diagram of a line commutation type fault current limiter according to an exemplary embodiment of the present invention.
Figure 2:
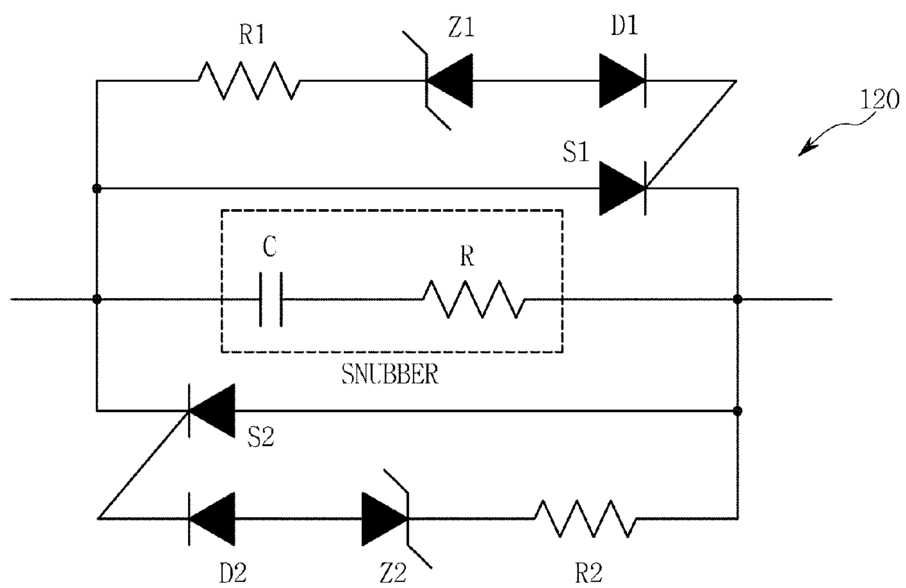
FIG. 2 is a detailed circuit diagram of a Zener diode switch used in the line commutation type fault current limiter of FIG. 1 according to an exemplary embodiment of the present invention.

FIG. 1 is a circuit diagram of a line commutation type fault current limiter 100 according to an exemplary embodiment of the present invention. FIG. 2 is a detailed circuit diagram of a Zener diode switch 120 used in the line commutation type fault current limiter 100 according to an exemplary embodiment of the present invention.

Referring to FIG. 1, the line commutation type fault current limiter 100 includes a coupled inductor 110 connected to a main circuit, a Zener diode switch 120 electrically connected to the coupled inductor 110, a line commutation switch 140 connected to the Zener diode switch 120, and a current limiting unit 150 connected to the coupled inductor 110 by the line commutation switch 140. The line commutation type fault current limiter 100 may further include a fault detection unit 130 connected between the Zener diode switch 120 and the line commutation switch 140.

The coupled inductor 110 is connected to the main circuit. The coupled inductor 110 includes a primary side connected to the main circuit and a secondary side matched with the primary side. The coupled inductor 110 may be a typical transformer.

The primary side of the coupled inductor 110 is serially connected to the main circuit to form a current path flowing into the main circuit.

The secondary side of the coupled inductor 110 has a turn ratio which is preset in the primary side and is matched with the primary side. The secondary side of the coupled inductor 110 is electrically insulated from the primary side thereof. Accordingly, a voltage which is in proportion to a voltage across both ends of the primary side of the coupled inductor 110 is formed at both ends of the secondary side of the coupled inductor 110. As a result, a current proportional to a current flowing into the main circuit through the primary side of the coupled inductor 110 may be formed at the secondary side of the coupled inductor 110.

Referring to FIG. 1 and FIG. 2, the Zener diode switch 120 is electrically connected to the secondary side of the coupled inductor 110. The Zener diode switch 120 controls flow of current into the line commutation switch 140. The Zener diode 120 normally maintains a tuned-off state. However, if a voltage which is greater than a preset value is applied to the secondary side of the coupled inductor 110, the Zener diode 120 is turned on to form a path in which current flows into a driving coil 142 of the line commutation switch 140.

The Zener diode switch 120 may include a snubber connected between the secondary side of the coupled inductor 110 and the line commutation switch 140, a pair of thyristors S1 and S2 connected in parallel with the snubber and connected in reverse parallel with each other, a pair of diodes D1 and D2 connected respectively to control electrodes of the thyristors S1 and S2, and a pair of Zener diodes Z1 and Z2 connected respectively to the diodes D1 and D2. Resistors R1 and R2 may be connected to the Zener diodes Z1 and Z2 and the snubber.

The snubber is serially connected between the secondary side of the coupled inductor 110 and the line commutation switch 140. The snubber prevents an excessive voltage from being applied to the secondary side of the coupled inductor 110 according to a change of current flow of the coupled inductor 110, thereby preventing noise and malfunction. An R-C snubber comprised of a resistor R and a capacitor C may be used for the snubber. However, the snubber is not limited to this particular snubber configuration.

The thyristors S1 and S2 connected in parallel with the snubber are in reverse parallel with each other. An anode electrode and a cathode electrode of each of the thyristors S1 and S2 are connected to both ends of the snubber. Cathode electrodes of the diodes D1 and D2 are connected to control electrodes of the thyristors S1 and S2, respectively, and control signals are applied to the control electrodes of the thyristors S1 and S2. If the thyristors S1 and S2 are turned on by the control signals, a large part of current applied to the line commutation switch 140 flows through the thyristors S1 and S2.

The diodes D1 and D2 are connected to the control electrodes of thyristors S1 and S2. The diodes D1 and D2 are located reversely to the Zener diodes Z1 and Z2, respectively, thereby cutting off a forward current flowing into the Zener diodes Z1 and Z2. Namely, since the diodes D1 and D2 pass through only a reverse current of the Zener diodes Z1 and Z2, the diodes D1 and D2 pass through a current only when a voltage greater than a breakdown voltage is applied to the Zener diodes Z1 and Z2. Consequently, the thyristors S1 and S2 are turned on by the diodes D1 and D2 only when an overcurrent flows, thereby operating the current limiting unit 150. The upper diode D1 and the lower diode D2 are complementarily turned on according to polarity of an alternating current (AC) voltage applied to the diodes D1 and D2. Therefore, the thyristors S1 and S2 connected to the diodes D1 and D2 are also turned on complementarily.

The Zener diodes Z1 and Z2 are reversely connected to the diodes D1 and D2. Anode electrodes of the Zener diodes Z1 and Z2 are connected to anode electrodes of the diodes D1 and D2 and cathode electrodes of the Zener diodes Z1 and Z2 are connected to the snubber through the resistors R1 and R2, respectively. Since a forward current of the Zener diodes Z1 and Z2 is cut off by the diodes D1 and D2, if a voltage greater than a breakdown voltage is applied in a reverse direction of the Zener diodes Z1 and Z2, a current flows into the Zener diodes Z1 and Z2. The upper Zener diode Z1 and the lower Zener diode Z2 are complementarily turned on according to turning-on of the Diodes D1 and D2.

The resistors R1 and R2 are connected between the Zener diodes Z1 and Z2 and the snubber. The resistors R1 and R2 protect the Zener diodes Z1 and Z2 and the diodes D1 and D2 from an abrupt voltage and current.

The fault detection unit 130 is connected between the coupled inductor 110 and the Zener diode switch 120 and is in parallel with the driving coil 142 of the line commutation switch 140. The fault detection unit 130 determines whether a fault current occurs. Namely, since the Zener diode switch 120 is operated by a voltage applied to the secondary side of the coupled inductor 110, the Zener diode switch 120 may be turned on for reasons other than the fault current. The fault detection unit 130 absorbs energy during a preset time, when a current of energy less than preset energy passes through the Zener diode switch 120. If the current continues to flow even after the preset time, the fault detection unit 130 judges the current to be a fault current and cuts off the current. Then the current flows into the driving coil 142.

The line commutation switch 140 is electrically connected to the Zener diode switch 120. The line commutation switch 140 connects the main circuit in a normal state so that a current flows into the main circuit. If a fault current flows, the line commutation switch 140 cuts off the main circuit and causes the fault current to flow into the current limiting unit 150, thereby limiting the fault current.

The line commutation switch 140 includes a main circuit switch 141 connected to the coupled inductor 110, the driving coil 142 connected to the Zener diode switch 120, a repulsion plate 143 located separately from the driving coil 142, and a current limiting circuit switch 144 connected mechanically to the repulsion plate 143.

The main circuit switch 141 is connected to the coupled inductor 110 to constitute the main circuit and maintains a normally turned-on state. Accordingly, in a normal state, the main circuit switch 141 is closed and a current passing through the primary side of the coupled inductor 110 and the main circuit switch 141 may be applied to a load.

The driving coil 142 is connected between the Zener diode switch 120 and the secondary side of the coupled inductor 110. In a normal state, since the Zener diode switch 120 is turned off, a current does not flow into the driving coil 142. However, if the Zener diode switch 120 is turned on by occurrence of a fault current, a current passing through the Zener diode switch 120 from the secondary side of the coupled inductor 110 flows into the driving coil 142. As a result, the current causes a magnetic force to occur around the driving coil 142.

The repulsion plate 143 is located separately from the driving coil 142. The main circuit switch 141 and the current limiting circuit switch 144 are mechanically connected to the repulsion plate 143 and are electrically insulated from the repulsion plate 143. Therefore, both the main circuit switch 141 and the current limiting circuit switch 144 move mechanically together according to operation of the repulsion plate 143. The repulsion plate 143 is subjected to a repulsive force from the driving coil 142 by the magnetic force generated around the driving coil 142. Then the repulsion plate 143 is distanced from the driving coil 142. If the repulsion plate 143 is distanced from the driving coil 142, the main circuit switch 141 is opened and the current limiting circuit switch 144 is closed, thereby forming a bypass path.

The current limiting circuit switch 144 is connected to a parallel branch of the primary side of the coupled inductor 110. The current limiting circuit switch 144 has a normally turned-off state. Accordingly, the parallel branch of the primary side of the coupled inductor 110 maintain an open state. However, if a fault current is applied and thus the repulsion plate 143 is distanced from the driving coil 142, the current limiting circuit switch 144 is closed. Since the parallel branches of the primary side of the coupled inductor 110 are thereby shorted, a bypass path is formed with respect to the coupled inductor 110. In this case, since the main circuit switch 141 is opened, a current passing through the bypass path passes through the current limiting unit 150, thereby limiting the current.

The current limiting unit 150 is connected in parallel with the main circuit switch 141. If the main circuit switch 141 is opened and simultaneously the current limiting circuit switch 144 is closed, a current passing through the current limiting circuit switch 144 flows into the current limiting unit 150. The current limiting unit 150 may be constructed by at least one of devices having impedance to limit a fault current, such as a power fuse, a resistor, a reactor, a superconductor, and a semiconductor element. Thus the current limiting unit 150 limits the current. Consequently, the current limiting unit 150 prevents a fault current from flowing into the load, thereby protecting the load.

As described above, since the line commutation type fault current limiter 100 includes the coupled inductor 110 connected to the main circuit, instead of a superconductor as a device for sensing a fault current, manufacturing costs can be reduced.

Hereinafter, the configuration of a line commutation type fault current limiter according to another exemplary embodiment of the present invention will be described.

Figure 3:
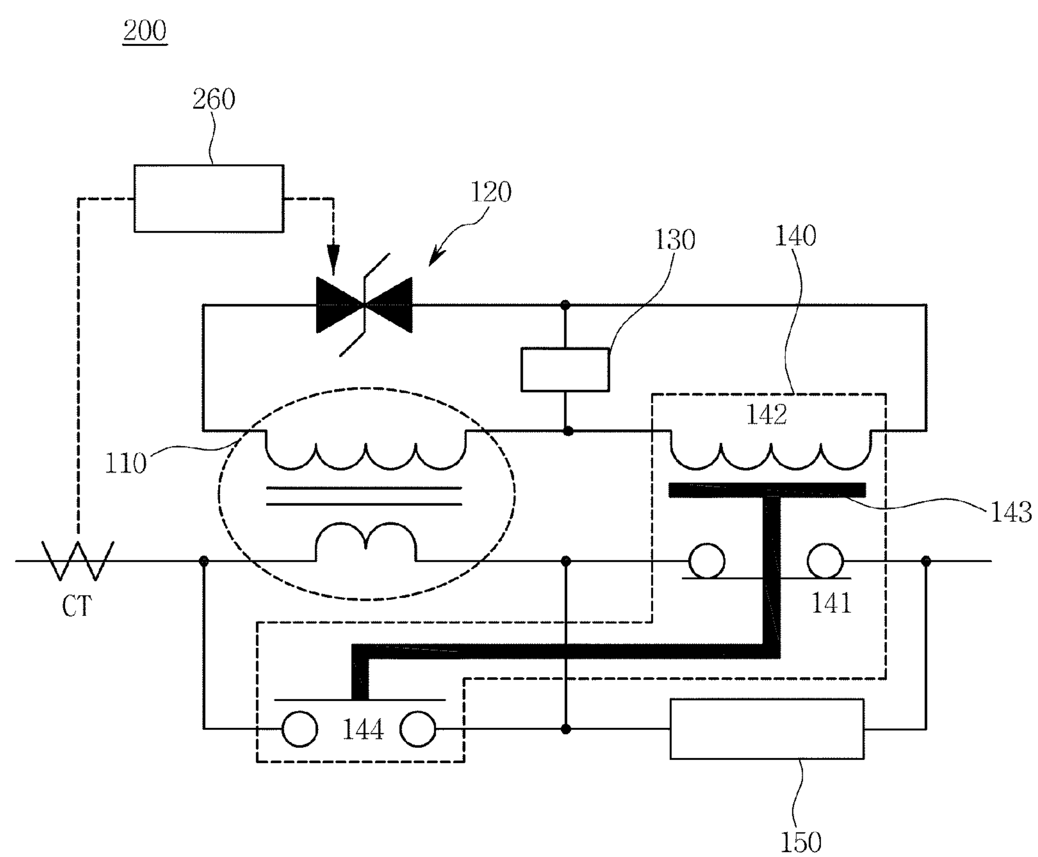
FIG. 3 is a circuit diagram of a line commutation type fault current limiter according to another exemplary embodiment of the present invention.

FIG. 3 is a circuit diagram of a line commutation type fault current limiter 200 according to another exemplary embodiment of the present invention. In FIG. 3, parts having the same construction and operation as those in the previous embodiment are denoted by the same reference numerals and a description will be given centering on those parts which differ from the previous embodiment.

Referring to FIG. 3, the line commutation type fault current limiter 200 includes a coupled inductor 110, a Zener diode switch 120, a line commutation switch 140, a current limiting unit 150, and a fault sensing unit 260 connected to the Zener diode switch 120. The line commutation type current limiter 200 may further include a fault detection unit 130 connected in parallel with the line commutation switch 140 between a secondary side of the coupled inductor 110 and the Zener diode switch 120.

The fault sensing unit 260 senses whether a fault current occurs at a main circuit through a current transformer CT electrically coupled with the main circuit. The fault sensing unit 260 is electrically connected to the Zener diode switch 120. If a fault current occurs at the main circuit, the fault sensing unit 260 applies an electric signal to the Zener diode switch 120 to turn on the Zener diode switch 120. Namely, the fault sensing unit 260 directly drives the Zener diode switch 120 when the fault current occurs at the main circuit. Accordingly, upon occurrence of the fault current, the line commutation type fault current limiter 200 does not depend only on the operation of the Zener diode switch 120 comprised of passive elements and causes the fault sensing unit 260 comprised of active elements to directly control the Zener diode switch 120, thereby increasing the reliability of operation.

Since the line commutation type fault current limiter 200 according to another embodiment of the present invention does not include a superconductor for sensing a fault current, manufacturing costs can be reduced. Moreover, since the fault sensing unit 260 comprised of active elements connected to the current transformer CT of the main circuit can directly control the Zener diode switch 120 during occurrence of the fault current, the reliability of operation can be ensured.

Hereinafter, the configuration of a line commutation type fault current limiter according to a further exemplary embodiment of the present invention will be described.

Figure 4:
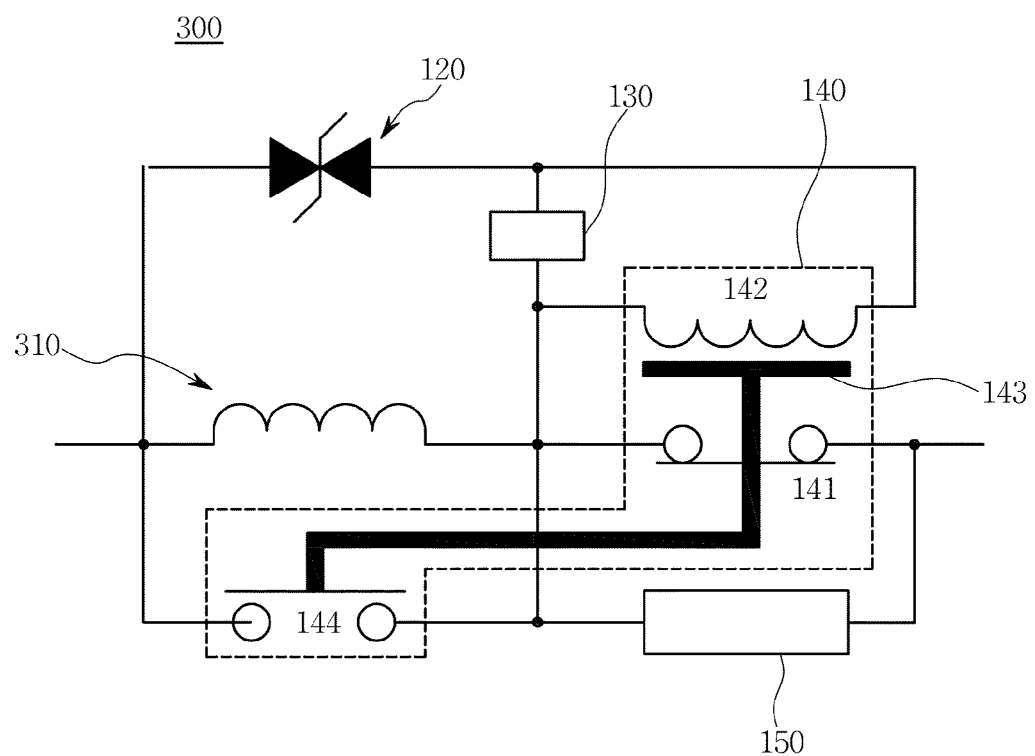
FIG. 4 is a circuit diagram of a line commutation type fault current limiter according to a further exemplary embodiment of the present invention.

FIG. 4 is a circuit diagram of a line commutation type fault current limiter 300 according to a further exemplary embodiment of the present invention.

Referring to FIG. 4, the line commutation type fault current limiter 300 includes an inductor 310 connected to a main circuit, a Zener diode switch 120 connected to an end of the inductor 310, a line commutation switch 140 connected to the Zener diode switch 120, and a current limiting unit 150 connected to the inductor 310. The line commutation type fault current limiter 300 may further include a fault detection unit 130 connected between the Zener diode switch 120 and the line commutation switch 140.

The Zener diode switch 120, the fault detection unit 130, the line commutation switch 140, and the current limiting unit 150 are connected electrically to the inductor 310. That is, as opposed to the line commutation type fault current limiter 100 in which the Zener diode switch 120, the fault detection unit 130, the line commutation switch 140, and the current limiting unit 150 are electrically connected to the coupled inductor 110, the line commutation type fault current limiter 300 includes the Zener diode switch 120, the fault detection unit 130, the line commutation switch 140, and the current limiting unit 150 which are connected to the inductor 310. The constructions of the Zener diode switch 120, the fault detection unit 130, the line commutation switch 140, and the current limiting unit 150 except for the above-mentioned construction are the same as in the previous embodiment.

The inductor 310 is serially connected to the main circuit. In a normal state, a current flowing into the main circuit is applied to the inductor 310 and the inductor 310 causes the main circuit to be connected to a load through the main circuit switch 141. If a fault current flows into the main circuit, the Zener diode switch 120 is turned on and thus the current flows not only to the inductor 310 but also to the Zener diode switch 120. The current passing though the Zener diode 120 passes through a driving coil 142 of the line commutation switch 140, thereby generating a repulsive force on a repulsion plate 143. According to movement of the repulsion plate 143, the main circuit switch 141 is opened and a current limiting circuit switch 144 is closed. Therefore, a bypass path is formed with respect to the inductor 310 and the current limiting unit 150 limits the current flowing into the main circuit.

As described above, the line commutation type fault current limiter 300 according to a further exemplary embodiment of the present invention does not use a superconductor for sensing a fault current and uses a single inductor instead of the coupled inductor of the previous embodiments. Accordingly, manufacturing costs can be further reduced.

Hereinafter, the configuration of a line commutation type fault current limiter according to another exemplary embodiment of the present invention will be described.

Figure 5:
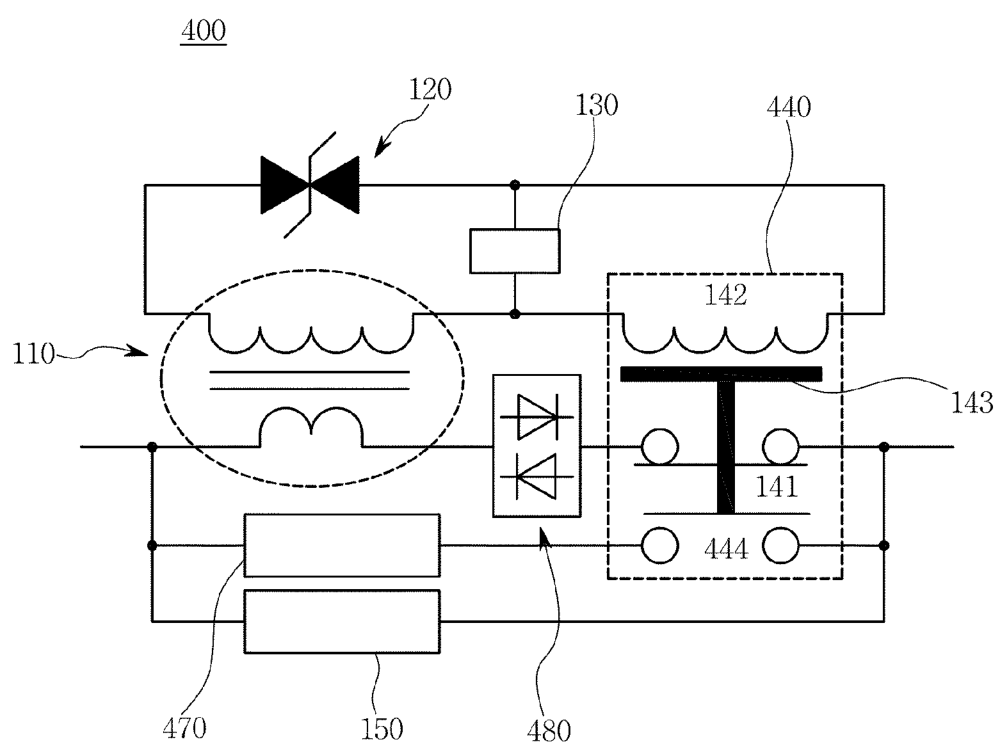
FIG. 5 is a circuit diagram of a line commutation type fault current limiter according to another exemplary embodiment of the present invention.

FIG. 5 is a circuit diagram of a line commutation type fault current limiter 400 according to another exemplary embodiment of the present invention.

Referring to FIG. 5, the line commutation type current limiter 400 includes a coupled inductor 110, a Zener diode switch 120, a fault detection unit 130, a line commutation switch 440 connected to the Zener diode switch 120, a current limiting assembly electrically connected in series to the line commutation switch to limit a current flowing into a main circuit, and a semiconductor element switch 480 connected between a primary side of the coupled inductor 110 and the line commutation switch 440. The current limiting assembly includes a current limiting unit 150, and a power fuse 470 connected in parallel with current limiting unit 150.

The line commutation switch 440 includes a main circuit switch 141 connected to the primary side of the coupled inductor 110, a driving coil 142 connected between a secondary side of the coupled inductor 110 and the Zener diode switch 120, a repulsion plate 143, and a current limiting circuit switch 444 connected mechanically to the repulsion plate 143.

The current limiting circuit switch 444 is mechanically connected to the repulsion plate 143 and moves together with the repulsion plate 143 according to movement of the repulsion plate 143. The current limiting circuit switch 444 maintains a normally turned-off state. Accordingly, in a normal state, a current does not flow into the power fuse 470. If a fault current flows into the primary side of the coupled inductor 110, the current limiting circuit switch 444 moves together with the repulsion plate 143 to be closed and causes the power fuse 470 to form a closed circuit. Therefore, the current flows into the power fuse 470. If a current exceeding a permissible current flows into the power fuse 470, the power fuse 470 is cut.

The power fuse 470 is serially connected to the current limiting circuit switch 444 of the line commutation switch 440. In addition, the power fuse 470 is connected in parallel with the current limiting unit 150. If a fault current exceeding a permissible value flows into the power fuse 470, the power fuse 470 is melted. Then the fault current is bypassed to the current limiting unit 150 connected in parallel with the power fuse 470 and the current limiting unit 150 limits the current.

The semiconductor element switch 480 is connected between the primary side of the coupled inductor 110 and the main circuit switch 141 of the line commutation switch 440. The semiconductor element switch 480 completely removes an arc current which remains even though the line commutation switch 440 cuts off the main circuit by occurrence of a fault current. That is, even though the line commutation switch 440 cuts off the main circuit, an arc current may remain at the main circuit. The semiconductor element switch 480 completely removes the remaining current. If ½ period of the fault current elapses and the fault current reaches zero point, an electric arc of the line commutation switch 440 is completely extinguished and the fault current flows into the current limiting unit 150 and is limited by the current limiting unit 150

Thus the line commutation type fault current limiter 400 according to another exemplary embodiment of the present invention includes the power fuse 470 which can cut off the circuit when a fault current exceeding a reference value occurs. The power fuse 470 prevents the fault current from being transmitted to a load to protect the load.

As described above, the line commutation type fault current limiter of the present invention includes a coupled inductor or an inductor instead of a conventional superconductor and includes a power semiconductor element switch, such as a Zener diode switch, connected to a secondary side of the coupled inductor or a parallel circuit of the inductor. Therefore, the line commutation type fault current limiter can reduce burdens related to installation, operation, and size.

Furthermore, upon occurrence of a fault current, a fault sensing unit can actively control a current induced by the coupled inductor or a current bypassing the inductor, thereby increasing reliability and flexibility.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A line commutation type fault current limiter comprising:

a coupled inductor having a primary side connected to a main circuit and a secondary side matched with the primary side;

a Zener diode switch electrically connected to the secondary side of the coupled inductor;

a line commutation switch connected to the Zener diode switch as well as to the primary side of the coupled inductor to form a bypass path in parallel with the primary side of the coupled inductor and to cut off the main circuit, when the Zener diode switch is turned on; and a current limiting unit electrically connected in parallel with the line commutation switch to limit a current flowing into the main circuit.

2. The line commutation type fault current limiter of claim 1, wherein the Zener diode switch includes:

a snubber circuit electrically connected to the secondary side of the coupled inductor;

a pair of thyristors connected in reverse parallel with each other, each of the thyristors having an anode electrode and a cathode electrode connected in parallel with the snubber circuit;

a pair of diodes, each of the diodes having a cathode electrode connected to a control electrode of each of the thyristors; and a pair of Zener diodes, each of the Zener diodes having an anode electrode connected to an anode electrode of each of the diodes and having a cathode electrode connected to the anode electrode of each of the thyristors.

3. The line commutation type fault current limiter of claim 2, wherein the Zener diode switch further includes resistors connected between the cathode electrodes of the Zener diodes and the anode electrodes of the thyristors.

4. The line commutation type fault current limiter of claim 1, wherein the line commutation switch includes:

a main circuit switch serially connected to the primary side of the coupled inductor connected to the main circuit;

a driving coil electrically connected to the Zener diode switch and to the secondary side of the coupled inductor;

a repulsion plate mechanically connected to the main circuit switch and located separately from the driving coil to open the main circuit switch by a magnetic force of the driving coil when a current is applied to the driving coil; and a current limiting circuit switch mechanically connected to the repulsion plate to short the bypass path formed in parallel with the primary side of the coupled inductor when a current is applied to the driving coil.

5. The line commutation type fault current limiter of claim 4, wherein the current limiting unit is electrically connected in parallel with the main circuit switch of the line commutation switch.

6. The line commutation type fault current limiter of claim 4, further comprising:

a fault detection unit connected in parallel with the driving coil in the line commutation switch to determine a fault signal by absorbing energy during a preset time when a current of energy less than preset energy passes through the Zener diode switch.

7. The line commutation type fault current limiter of claim 6, wherein the fault detection unit is at least one or a combination of a superconductor, a condenser, and a high pass filter.

8. The line commutation type fault current limiter of claim 1, wherein the current limiting unit is at least one or a combination of a power fuse, a nonlinear variable conductor, a reactor coil, a power semiconductor switch, and a superconductor.

9. The line commutation type fault current limiter of claim 1, further comprising:

a fault sensing unit connected to the Zener diode switch to apply an electric signal which turns on the Zener diode switch when a fault current is applied to the primary side of the coupled inductor.

10. A line commutation type fault current limiter comprising:

a coupled inductor having a primary side connected to a main circuit and a secondary side matched with the primary side;

a Zener diode switch electrically connected to the secondary side of the coupled inductor;

a line commutation switch connected to the Zener diode switch as well as to the primary side of the coupled inductor to form a bypass path in parallel with the primary side of the coupled inductor and to cut off the main circuit, when the Zener diode switch is turned on; and a current limiting assembly, which comprises a current limiting unit and a power fuse connected in parallel with each other, in the bypass path and electrically connected in series to the line commutation switch to limit a current flowing into the main circuit.

11. The line commutation type fault current limiter of claim 10, wherein the Zener diode switch includes:

a snubber circuit electrically connected to the secondary side of the coupled inductor;

a pair of thyristors connected in reverse parallel with each other, each of the thyristors having an anode electrode and a cathode electrode connected in parallel with the snubber circuit;

a pair of diodes, each of the diodes having a cathode electrode connected to a control electrode of each of the thyristors; and a pair of Zener diodes, each of the Zener diodes having an anode electrode connected to an anode electrode of each of the diodes and having a cathode electrode connected to the anode electrode of each of the thyristors.

12. The line commutation type fault current limiter of claim 10, wherein the line commutation switch includes:

a main circuit switch serially connected to the primary side of the coupled inductor connected to the main circuit;

a driving coil electrically connected to the Zener diode switch and to the secondary side of the coupled inductor;

a repulsion plate mechanically connected to the main circuit switch and located separately from the driving coil to open the main circuit switch by a magnetic force of the driving coil when a current is applied to the driving coil; and a current limiting circuit switch mechanically connected to the repulsion plate to short the bypass path formed in parallel with the main circuit switch and the primary side of the coupled inductor when a current is applied to the driving coil.

13. The line commutation type fault current limiter of claim 10, wherein the current limiting assembly, together with the current limiting circuit switch, forms the bypass path to the primary side of the coupled inductor and the main circuit switch.

14. The line commutation type fault current limiter of claim 10, further comprising:

a semiconductor element switch connected between the primary side of the coupled inductor and the main circuit switch.

15. A line commutation type fault current limiter comprising:

an inductor connected to a main circuit;

a Zener diode switch electrically connected to an end of the inductor;

a line commutation switch connected to the Zener diode switch as well as the other end of the indictor to form a bypass path in parallel with the inductor and to cut off the main circuit, when the Zener diode switch is turned on; and a current limiting unit electrically connected in parallel with the line commutation switch to limit a current flowing into the main circuit.

16. The line commutation type fault current limiter of claim 15, wherein the Zener diode switch includes:

a snubber circuit electrically connected to an end of the inductor;

a pair of thyristors connected in reverse parallel with each other, each of the thyristors having an anode electrode and a cathode electrode connected in parallel with the snubber circuit;

a pair of diodes, each of the diodes having a cathode electrode connected to a control electrode of each of the thyristors; and a pair of Zener diodes, each of the Zener diodes having an anode electrode connected to an anode electrode of each of the diodes and having a cathode electrode connected to the anode electrode of each of the thyristors.

17. The line commutation type fault current limiter of claim 15, wherein the line commutation switch includes:

a main circuit switch serially connected to the other end of the inductor connected to the main circuit;

a driving coil electrically connected to the Zener diode switch and to the other end of the inductor;

a repulsion plate mechanically connected to the main circuit switch and located separately from the driving coil to open the main circuit switch by a magnetic force of the driving coil when a current is applied to the driving coil; and a current limiting circuit switch mechanically connected to the repulsion plate to short the bypass path formed in parallel with the inductor when a current is applied to the driving coil.

18. The line commutation type fault current limiter of claim 15, wherein the current limiting unit is electrically connected in parallel with the main circuit switch of the line commutation switch.

* * * * *